(12) United States Patent
Liao

(10) Patent No.: US 7,378,822 B2
(45) Date of Patent: May 27, 2008

(54) SWITCHING REGULATOR SLOPE COMPENSATION GENERATOR CIRCUIT

(75) Inventor: Chiawei Liao, San Jose, CA (US)

(73) Assignee: Linear Technology Corporation, Milpitas, CA (US)

(*) Notice: Subject to any disclaimer, the term of this patent is extended or adjusted under 35 U.S.C. 154(b) by 236 days.

(21) Appl. No.: 11/282,992

(22) Filed: Nov. 17, 2005

(65) Prior Publication Data
US 2007/0108947 A1 May 17, 2007

(51) Int. Cl.
G05F 1/10 (2006.01)
G05F 1/652 (2006.01)
G05F 1/56 (2006.01)
G05F 1/44 (2006.01)

(52) U.S. Cl. .............. 323/222; 323/282; 323/284; 323/285

(58) Field of Classification Search ......... 323/222, 323/282, 283, 284, 285
See application file for complete search history.

(56) References Cited

U.S. PATENT DOCUMENTS

| 3,571,697 A | 3/1971 | Phillips |
| 3,579,091 A | 5/1971 | Clarke et al. |
| 3,733,540 A | 5/1973 | Hawkins |
| 3,879,647 A | 4/1975 | Hamilton et al. |
| 3,978,393 A | 8/1976 | Wisner et al. |
| 4,013,939 A | 3/1977 | Biess et al. |
| 4,035,710 A | 7/1977 | Joyce |
| 4,541,041 A | 9/1985 | Park et al. |
| 4,578,630 A | 3/1986 | Grosch |
| 4,672,518 A | 6/1987 | Murdock |
| 4,674,020 A | 6/1987 | Hill |
| 4,712,169 A | 12/1987 | Albach |
| 4,975,820 A | 12/1990 | Szepesi |
| 5,079,453 A * | 1/1992 | Tisinger et al. ............ 327/132 |
| 5,335,162 A * | 8/1994 | Martin-Lopez et al. ....... 363/97 |

(Continued)

FOREIGN PATENT DOCUMENTS

WO      WO 99/08372      2/1999

OTHER PUBLICATIONS

Gontowski et al., "Advanced New Integrated Circuits For Current-Mode Control," Proceedings of the Power Electronics Show and Conference, pp. 341-352, Oct. 1986.

(Continued)

*Primary Examiner*—Bao Q. Vu
(74) *Attorney, Agent, or Firm*—McDermott Will & Emery LLP

(57) ABSTRACT

A slope compensation circuit that provides slope compensation in a switching regulator is provided. The slope compensation circuit preferably is adapted to receive an oscillator pulse train from a pulse width modulator oscillator and a modulator pulse train from a pulse width modulator. The circuit preferably includes a feedback loop that is responsive to the oscillator pulse train. The circuit preferably provides a slope compensation pulse train of ON and OFF states that is responsive in part to the feedback loop and in part to the pulse width modulator switch pulse train. The invention preferably achieves lower maximum slope compensation current by incorporating an analog feedback loop in the PWM system to start slope compensation preferably only slightly ahead of PWM switch-OFF. This preferably occurs independent of the PWM duty cycle.

16 Claims, 7 Drawing Sheets

U.S. PATENT DOCUMENTS

| | | | | |
|---|---|---|---|---|
| 5,903,452 | A | * | 5/1999 | Yang .......................... 363/97 |
| 6,057,675 | A | | 5/2000 | Tateishi |
| 6,498,466 | B1 | * | 12/2002 | Edwards .................... 323/282 |
| 6,611,131 | B2 | * | 8/2003 | Edwards .................... 323/282 |
| 2004/0257057 | A1 | | 12/2004 | Nakata et al. |
| 2006/0103332 | A1 | | 5/2006 | Motomori et al. |
| 2007/0013355 | A1 | | 1/2007 | Liao |

OTHER PUBLICATIONS

International Rectifier, Clemente et al., "HV Floating MOS-Gate Driver IC," Application Note AN-978A, 1990.

Linear Technology, "LT1846/1847, LT3846/3847 Current Mode PWM Controller," Datasheet, 1990.

Maxim Integrated Products, Inc., "MAX746 High-Efficiency, PWM, Step-Down, N-Channel DC-DC Controller," Datasheet, Nov. 1993.

Maxim Integrated Products, Inc., "MAX747 High-Efficiency PWM, Step-Down P-Channel DC-DC Controller," Datasheet, Sep. 1993.

Maxim Integrated Products, Inc., "MAX783 Triple-Output Power-Supply Controller for Notebook Computers," Datasheet, May 1994.

Siliconix, "Designing DC/DC Converters with the Si9110 Switchmode Controller," Siliconix Power Products Data Book, 1991.

Williams, J., "Galvanically isolated switching supplies provide high power," EDN, Nov. 26, 1987.

Williams, J. and Huffman, B., "Precise converter designs enhance system performance," EDN, Oct. 13, 1988.

Williams, J., "Conversion techniques adapt voltages to your needs," EDN, Nov. 10, 1982.

Williams, J., "Design dc-dc converters to catch noise at the source," Electronic Design, Oct. 15, 1981.

International Search Report and Written Opinion of the International Searching Authority, issued in corresponding International Patent Application No. PCT/US2006/030797, dated on Aug. 6, 2007.

* cited by examiner

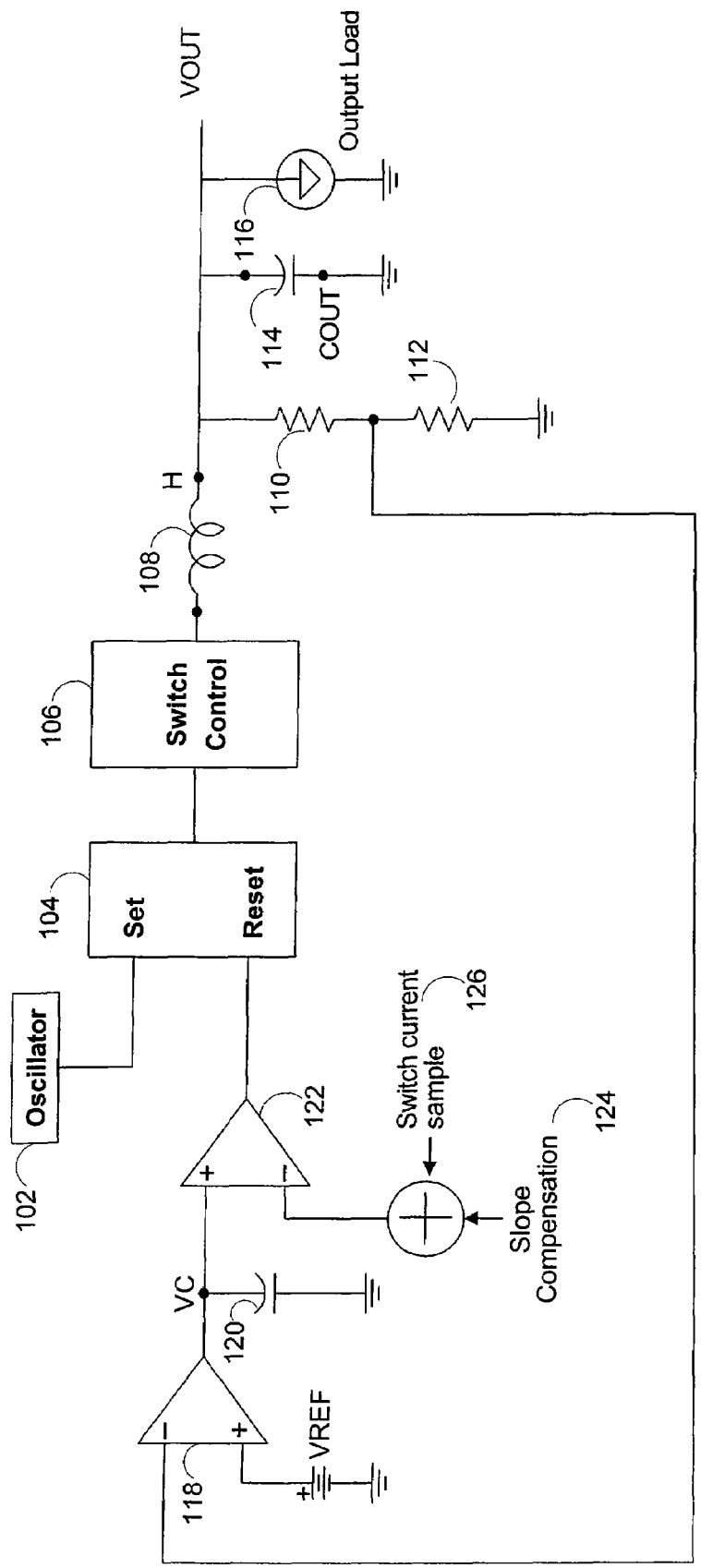
FIG. 1: Basic Current Mode Switching Regulator
Prior Art

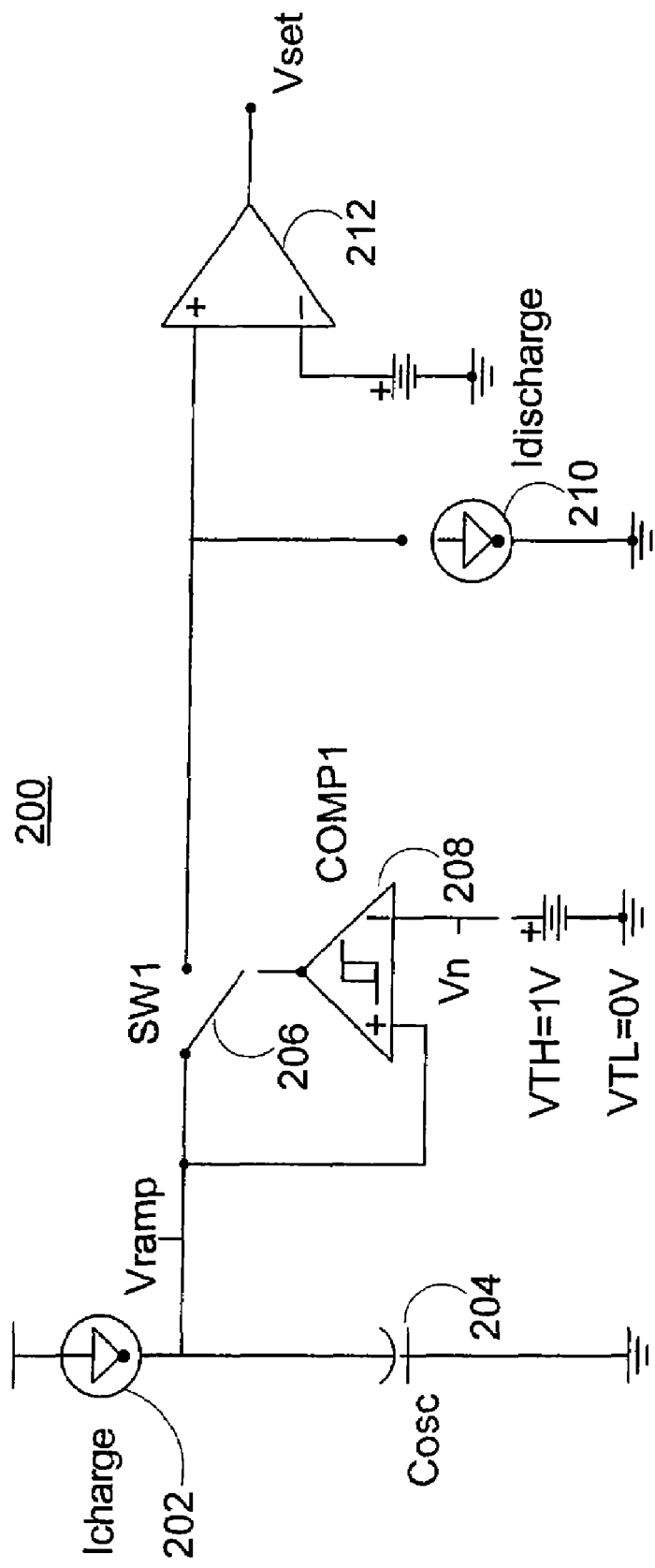
FIG. 2 Oscillator Of The FIG. 1 Regulator
Prior Art

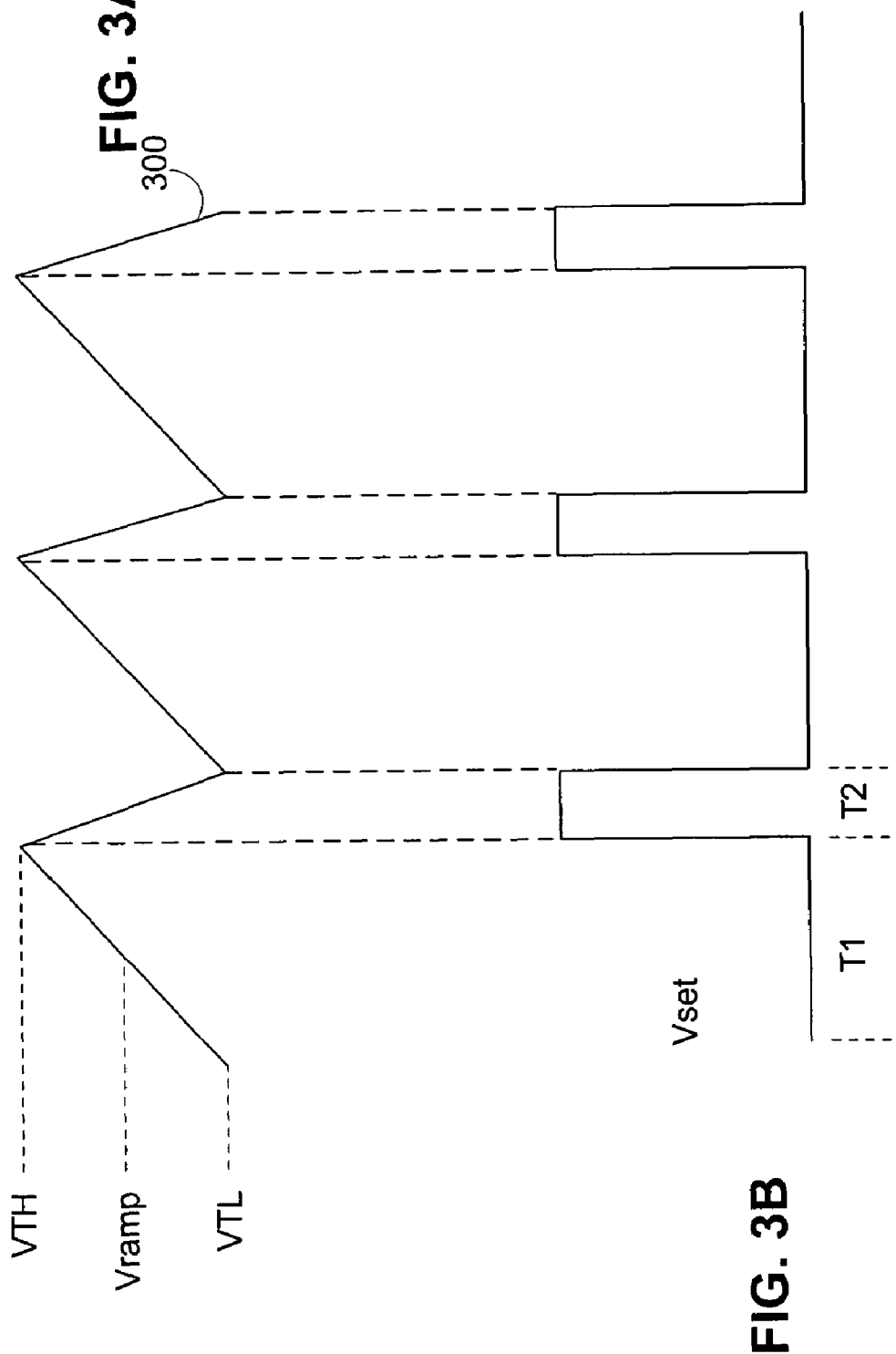
FIGS. 3A and 3B: Prior art

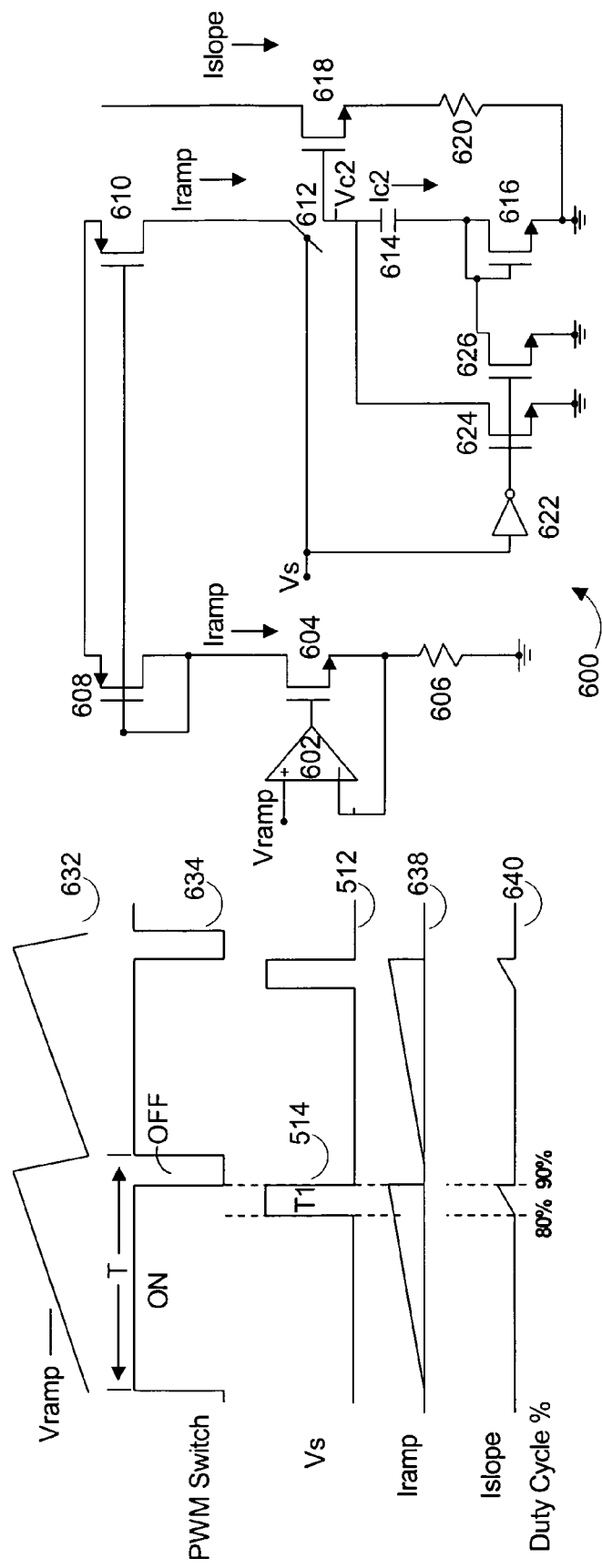

SWITCHING REGULATOR SLOPE COMPENSATION GENERATOR CIRCUIT

BACKGROUND OF THE INVENTION

The present invention relates to switching regulator circuits. More particularly, the present invention relates to circuits and methods for maintaining constant amounts of slope compensation in switching regulators preferably independent of variations of switching frequency of the regulators.

The purpose of a voltage regulator is to provide a predetermined and substantially constant output voltage to a load from a voltage source which may be poorly-specified or fluctuating. Two types of regulators are commonly used to provide this function; a linear regulator and a switching regulator. In a typical linear regulator, the output voltage is regulated by controlling the flow of current through a pass element from the voltage source to the load.

In switching voltage regulators, however, the flow of current from the voltage source to the load is not steady, but is rather in the form of discrete current pulses. To create the discrete current pulses, switching regulators usually employ a switch (such as a power transistor) that is coupled either in series or parallel with the load. The current pulses are then converted into a steady load current with an inductive storage element.

By controlling the duty cycle of this switch—i.e., the percentage of time that the switch is ON relative to the total period of the switching cycle—the switching voltage regulator can regulate the load voltage. In current-mode switching voltage regulators—i.e., a switching regulator that is controlled by a current-derived signal in the regulator—there is an inherent instability when the duty cycle exceeds 50%—i.e., when the switch is ON for more than 50% of a given switching period. Stability is often maintained in such current-mode switching regulators by adjusting the current-derived signal used to control the regulator with a slope compensation signal which compensates for the instability present at higher duty cycles. From the slope compensation theory it is generally known that the slope compensation signal is only needed at the instant when the switching regulator switch turns OFF One method of producing such a slope compensation signal is to use a portion of an oscillator signal as the compensation signal. The oscillator signal may be, for example, a ramp signal that is used to generate a clock signal that controls the switching of the regulator. The slope compensation signal can be applied by either adding the ramp signal to the current-derived signal, or by subtracting it from a control signal. By deriving the slope compensation signal from a signal that oscillates the switch of the regulator, the slope compensation signal is synchronized with the switching of the regulator.

In the conventional current mode switching regulator 100 shown in FIG. 1, slope compensation is needed for the operating duty cycle of 50% or higher to avoid sub-harmonic oscillation. Switching regulator 100 preferably includes oscillator 102, flip-flop 104, preferably pulse width modulated switch control circuit 106, inductor 108, resistor divider formed from resistors 110 and 112, output capacitor 114, output load 116, voltage feedback (or other suitable type, such as current feedback, of) amplifier 118, feedback capacitor 120, and current comparator 122 which is adapted to receive a switch current sample 126 and a slope compensation signal 124 and to compare the sum of these signals with a signal from voltage feedback amplifier 118.

This exemplary circuit uses a common type of switching regulator which is known as a pulse-width modulation (PWM) regulator. The PWM regulator relies on pulse width modulation to produce output signals of different amplitudes. PWM switching regulators vary the duty-cycle of the output signals they produce in order to adjust the current supplied and the voltage level maintained at their output or outputs. The voltages supplied at the outputs of these regulators may depend on the ratio of the switch pulse width to the switch pulse period, a higher ratio producing a higher output voltage.

Oscillator 102 is shown in greater detail in FIG. 2 as oscillator 200. Oscillator 200 preferably includes a charging source 202 for charging oscillator capacitor 204, an oscillator switch 206, an oscillator current comparator 208, a discharging current sink 210 for discharging oscillator capacitor 204, and a second comparator 212 that provides the Vset signal to voltage regulator 100 (not shown in FIG. 2.)

Typically, regulators use the oscillator voltage Vramp, derived in the circuit shown in FIG. 2 and depicted as the signal 300 shown in FIG. 3A, as a reference to generate the slope compensation. Vset indicates the low and high signals, T1 and T2, respectively, that are transmitted to flip-flop 104 of voltage regulator 100.

FIG. 4A shows compensation curve Sx 402 with a selected portion of Vramp 404. The x-axis of FIG. 4A shows the duty cycle of the switching regulator. The y-axis runs from 0 volt to 1 volt. In order to generate slope compensation curve Sx 402, conventional switching regulators use the circuit shown in FIG. 4B. This circuit includes unity gain buffer 406, NPN transistor 408 and resistor 410.

Linear slope compensation curve Sx 402 typically starts at 50% duty cycle (as shown in FIG. 4A) and is determined by VB. In one particular case, VB may be equal to 0.5V (arbitrarily chosen). Furthermore, Sx 402 has a fixed slope determined by resistor 410.

The oscillator ramp Vramp is fed to the positive input of unity gain buffer 406 and VB and resistor 410 are connected to the negative input. Only when Vramp is higher than VB does NPN transistor 408 turn ON. The emitter current of transistor 408 is determined by:

$$\frac{Vramp - VB}{Res.410}$$

This emitter current of transistor 408 forms the slope compensation signal Sx 402.

VB determines slope compensation curve Sx 402 starting point Ts as follows:

$$Ts\ (Sx\ \text{Starting point}) = \frac{VB}{Vpeak\ \text{of}\ Vramp}$$

and resistor 410 determines the slope of the curve, as shown below:

$$\text{Slope of } Sx\ 402: \frac{dSx}{dt} = \frac{dVramp}{\text{Resistor } 410 \times dt}$$

Because Vramp is a linear ramp, VB is therefore directly proportional to the duty cycle. In one exemplary system, when VB=0.5, Ts corresponds to a 50% duty cycle from the foregoing equations.

One problem associated with the exemplary prior art configuration is that, because the slope compensation curve starts at 50%, it builds up to a very high level Smax at maximum duty cycle 100%.

This high level Smax can cause problems when the regulator is operating at a high duty cycle as follows. Because VC (shown as the output of feedback amplifier 118) at current comparator 122 positive input generally has the same value as the sum of the switch current sample and the slope compensation signal at the negative input of current comparator 122 when the regulator loop closes, it is often used to indicate the output current load level. But at a high duty cycle, the slope compensation builds up from 50% duty cycle and introduces high offset at VC, and VC will not accurately indicate true output load current. Because of this high offset at high duty cycle, problems include a reduced current limit level. This problem is especially pertinent if a fixed VC level is used for current limit. Furthermore, a highly efficient Burst Mode™ threshold will be off at light load situations if a fixed VC level is used to determine the Burst Mode™ threshold.

Another problem associated with the prior art is that the circuit has to use very high current to generate this high level slope compensation signal when operating at high duty cycle.

Therefore, it would be desirable to provide a slope compensation signal that does not cause the voltage regulator circuit to lose the indication of true output load current at high duty cycles.

It would also be desirable to limit the current required to generate a high level slope compensation signal at high duty cycles.

SUMMARY OF THE INVENTION

It is an object of the invention to provide a slope compensation signal that does not cause the voltage regulator circuit to lose the indication of true output load current at high duty cycles.

It is another object of the invention to limit the current (as presented by Smax of FIG. 4A) required to generate a high level slope compensation signal at high duty cycles.

A slope compensation circuit and method that provide slope compensation in a switching regulator are provided. In one embodiment of the invention, the slope compensation circuit preferably is adapted to receive an oscillator pulse train from a pulse width modulator oscillator and a modulator pulse train from a pulse width modulator.

The circuit preferably includes a feedback loop that is responsive to the oscillator pulse train. The circuit preferably provides a slope compensation pulse train of ON and OFF states that is responsive in part to the feedback loop and in part to the pulse width modulator switch pulse train. The duty cycle of the slope compensation pulse train is preferably less than the duty cycle of the pulse width modulator switch pulse train. Furthermore, the slope compensation pulse train preferably turns ON slightly before the PWM switch-OFF instant, and turns OFF preferably immediately after the PWM switch-OFF instant.

The slope compensation circuit also preferably includes a switch that turns ON when the slope compensation pulse train is ON and a current source that supplies current through the switch when the switch is ON. Finally, the slope compensation circuit preferably includes a slope compensation current source that generates slope compensation current when the switch is ON.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 1 shows a conventional switching regulator system 100;

FIG. 2 shows an oscillator that may be used to generate clock signals for the switching regulator system shown in FIG. 1;

FIGS. 3A and 3B show clock-oscillated signals;

FIG. 6A shows a graph of a portion of an oscillator signal and a portion of a slope compensation signal;

FIG. 6B shows a schematic diagram of a circuit according to the invention that generates a slope compensation signal based on an oscillator signal.

DETAILED DESCRIPTION OF THE DRAWINGS

Figure 4B:
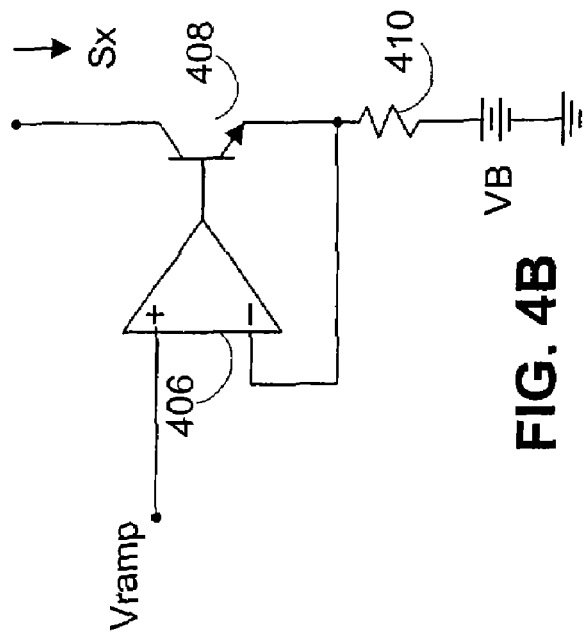
FIG. 4B shows a schematic diagram of a prior art circuit for generating a slope compensation signal based on an oscillator signal.

As mentioned above, it is generally known that slope compensation is only needed at the instant before the pulse width modulator switch turns OFF. As stated above, one major problem with the prior art circuit for producing slope compensation shown in FIG. 4B is that the slope compensation always starts at 50% of the duty cycle—i.e., when the ON portion of the duty cycle exceeds 50% of the time elapsed for an entire duty cycle—or some other comparable value, even when the switch does not turn OFF until the 90% point of the duty cycle. Over this whole range from about 50% to 90%, the slope compensation is unnecessary and only builds up to an unnecessarily high level. This high level of unnecessary slope compensation causes the problems described above. In practice, to reject the duty cycle jittering, the slope compensation can start at even as little as 5% of the total duty cycle time before the power switch of the switching regulator turns OFF.

One embodiment of a circuit according to the invention preferably initiates slope compensation only slightly ahead of the regulator switch turn-OFF instant. This prevents any unnecessary slope compensation at an earlier time of the duty cycle. For example, in a 90% duty cycle operation in a circuit according to the invention, slope compensation only starts at 80% duty cycle, 10% ahead of the switch-OFF instant. This significantly reduces the problematic slope compensation build-up level Smax at 90% duty cycle of the prior art circuit.

Figure 5B:
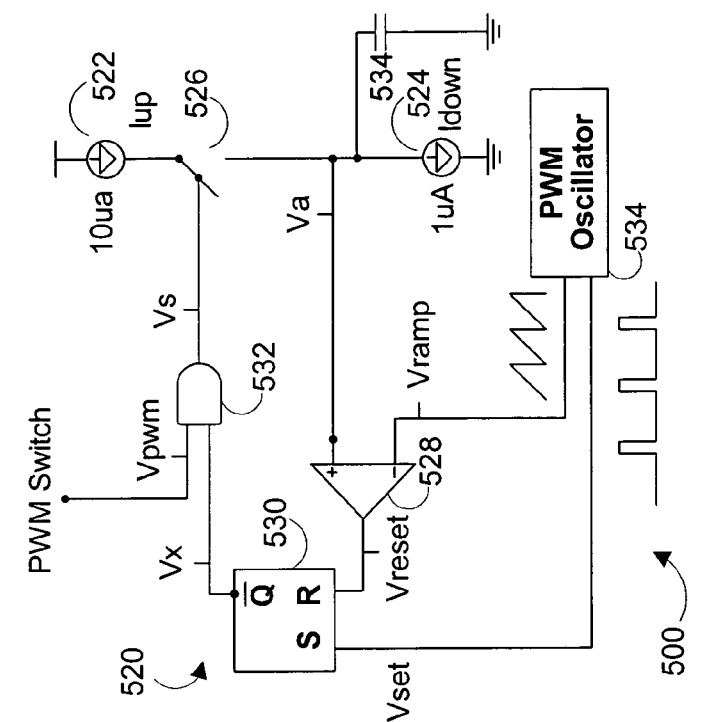
FIG. 5B shows a schematic diagram of a circuit according to the invention that generates a first signal that may be used to generate a slope compensation signal based on an oscillator signal and on a pulse-width-modulator switch signal.
Figure 5A:
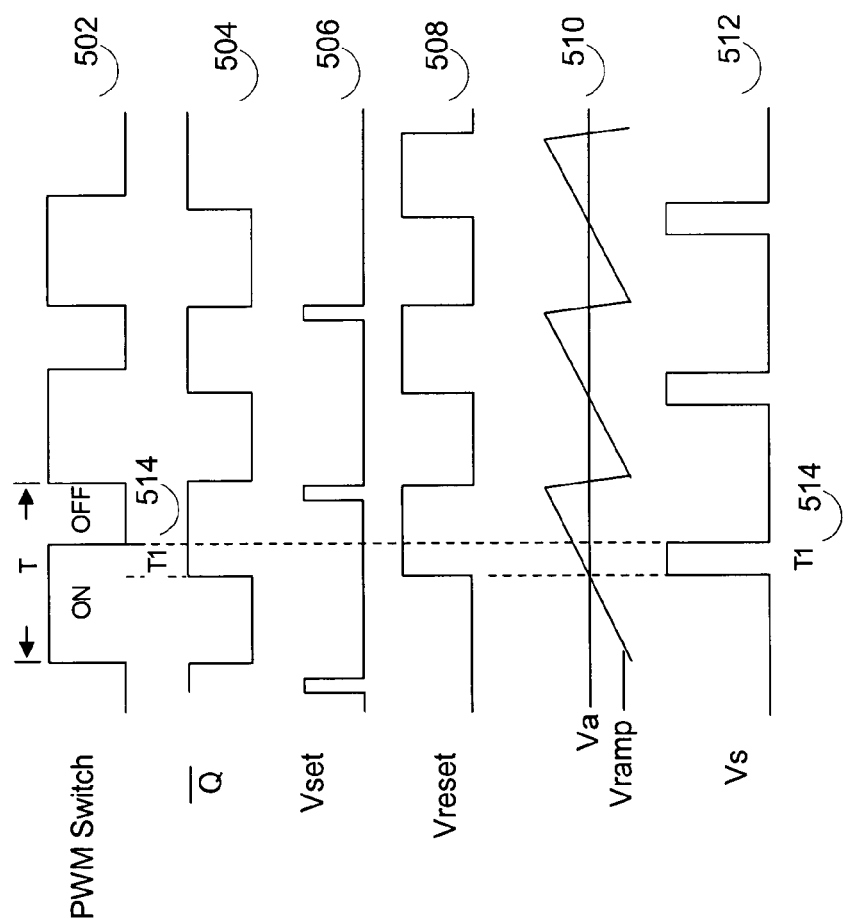
FIG. 5A shows various traces associated with the circuit in FIG. 5B.

FIG. 5A shows six different signal traces that illustrate operation of a circuit according to the invention. The circuit according to the invention that contributes to producing these signal traces is shown in FIG. 5B. The signals show a slope compensation window that occurs at an exemplary 10% time ahead of when the pulse width modulated (PWM) switch turns OFF. To achieve these functions, the invention circuit preferably uses a negative feedback loop 520 to first generate a pulse train Vs 512 that is synchronized to the PWM regulator switch turn-OFF instant at any suitable PWM operating duty cycle. The pulse width Tl 514 of Vs 512 is programmed by the current sources Iup 522 and Idown 524 and the ON time of the switch 526, as described in more detail below.

Vs 512, having pulse width Tl 514, which is programmed to turn ON 10% of the duty cycle ahead of the switch turn-OFF instant, is then used to turn ON switch 612 (shown in FIG. 6B) to pass the ramp signal Iramp (also shown in FIG. 6B) to charge the capacitor C2 for the desired slope compensation signal Islope.

The following is a description of the operation of one embodiment of a circuit 500 according to the invention as shown in FIG. 5B. Negative feedback loop 520 preferably includes a high gain amplifier 528, a charge comparator formed by current sources Iup 522, Idown 524 and switch 526, an SR latch 530, and an AND gate 532, and capacitor 534 (which has a capacitance of about 20 picofarads or other suitable capacitance.) Furthermore, the circuit is adapted to receive signals from PWM oscillator 534.

Iup 522 charges up capacitor 536 when switch 526 is turned ON, and Idown 524 discharges capacitor 536. Va rises preferably only when switch ON time is sufficiently long to allow for the following equation to balance: (Iup 522)×(Switch ON time)=Idown 524, with Iup=10 microamperes (uA) and Idown=1 uA dc current. In one exemplary embodiment, comparator 528 compares Va and the ramp signal Vramp of oscillator 534 to force switch 526 to turn ON to balance capacitor 534 as charged by Idown and Iup—e.g., in this case 10% of the total time of the duty cycle.

It should be noted that because PWM switch signal Vpwm is on one input of AND gate 532, switch 526 is preferably only allowed to turn ON when the PWM switch is ON and Vx is high. In other words, Vx, the SR latch 530 inverted output, which is connected to the other input of AND gate 532, allows switch 526 to turn ON when Vpwm is ON.

Latch 530 is set by PWM oscillator clock set signal Vset and latch 530 is reset by comparator 528. Comparator 528 compares Va, the charge comparator output, with the oscillator ramp Vramp.

This negative feedback loop 520 having comparator 528 as the amplifier and capacitor 536 as loop filter generates a pulse train Vs with a 10% pulse width Tl 514 that is synchronized to (and commences slightly ahead of) the PWM switch-OFF instant.

Pulse width Tl 514 in terms of percentage duty cycle is programmed as:

*Tl*/(Time of Duty Cycle)=*I*down/*I*up;

based on the principles of charge balance, as described above.

In response to Vs 512, the 10% pulse generated by circuit 500, controlling switch 526, circuit 500 generates slope compensation Islope 640 (FIG. 6A) only during Tl, 10% cycle time ahead of and simultaneously with the switch turn-OFF instant.

In response to signal Vs (the 10% pulse generated by the circuit shown in FIG. 5B) circuit 600 shown in FIG. 6B (and further illustrated by the traces shown in FIG. 6A) generates slope compensation Islope preferably only during Tl 514, at 10% of the duty cycle time and slightly ahead of the PWM switch turn-OFF instant.

With Vramp 510 of oscillator 534 connected to the unity gain amplifier 602, transistor 604 and resistor 606 generate Iramp. Transistors 608 and 610 are current mirror transistors used to generate Iramp at the drain of transistor 610 and at switch 612.

Switch 612 is controlled by Vs 512 and is turned ON only during Tl 514. When switch 612 turns ON, Iramp flows down to charge capacitor 614.

Transistor 616 preferably provides a level shift that cancels the gate to source voltage drop of transistor 618.

$$\text{With } \frac{dVc2}{dT} = \frac{Iramp}{Cap.614}, \text{ and } Islope = \frac{Vc2}{Res.620}$$

Therefore, the slope compensation $$\frac{dIslope}{dT} = \frac{dVc2}{dT \times Res.620} = \frac{Iramp}{Cap.614 \times Res.620}$$

Because Iramp 638 signal level increases as the duty cycle progresses, the slope of Islope 640 increases as the duty cycle progresses to meet the requirement.

Inverter 622, together with transistors 624 and 626, work to discharge capacitor 614 in preparation for the next cycle. By adjusting capacitor 614 and/or resistor 620, the desired slope of slope compensation signal Islope can be achieved.

Figure 4A:
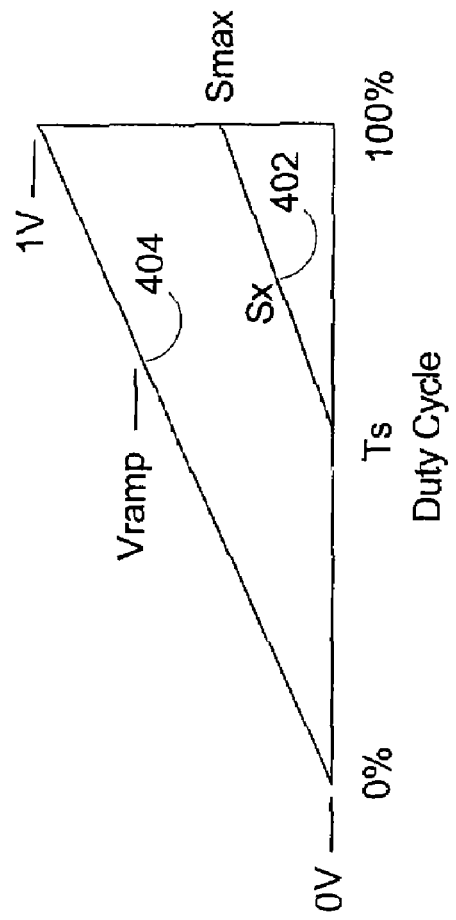
FIG. 4A shows a graph of a portion of an oscillator signal and a portion of a slope compensation signal.
Figure 7:
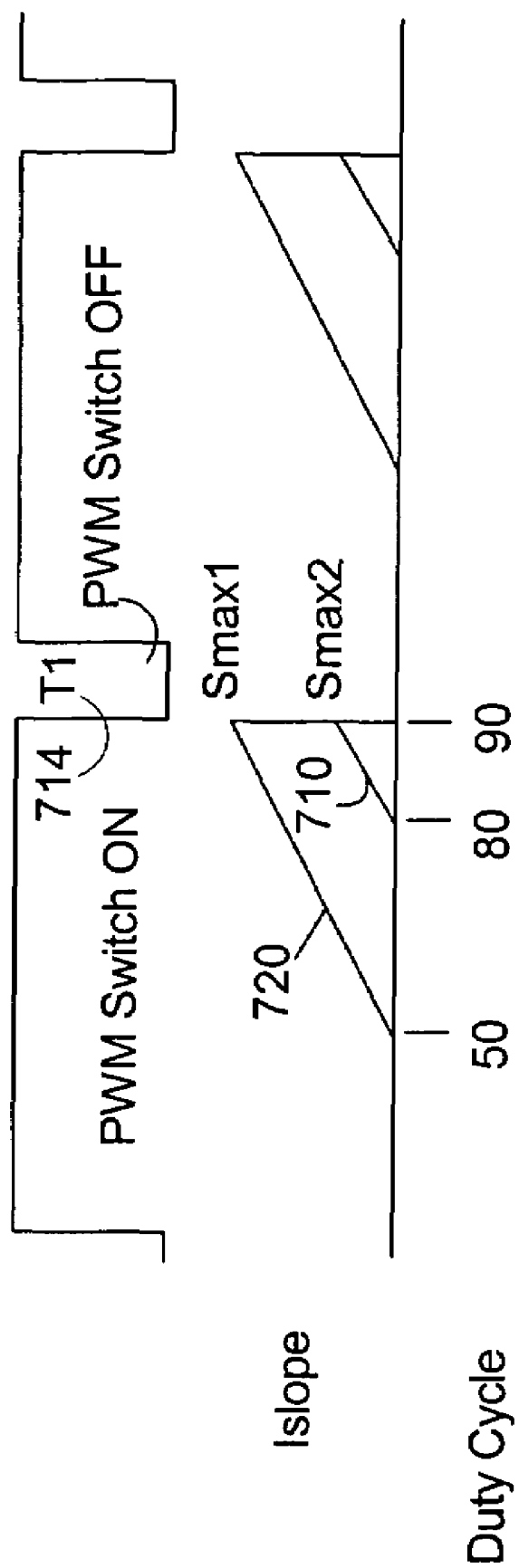
FIG. 7 shows a graph of a portion of an oscillator signal and a portion of a slope compensation signal according to the invention.

When the regulator operates at 90% duty cycle, FIG. 7 highlights the difference of the slope compensation curves between the slope compensation curve Islope 710 (which replicates Islope 640 shown in FIG. 6A) of the circuit according to the invention that starts at 80% duty cycle, and the slope of the prior art circuit Sx 720 (which replicates prior art slope compensation curve 402 Sx in FIG. 4A) that starts at 50% duty cycle. It should be noted that Islope 710 and prior art slope compensation curve 720 Sx may both have the same slope;

$$\frac{dslope}{dT}$$

at 90% duty cycle—i.e., the moment during the cycle when the PWM switch turns OFF. Clearly, Islope 710 has much lower accumulated level (Smax 1 is much greater than Smax 2 in FIG. 7) [and requires less current to implement. The drawbacks of the higher Smax 1 are more fully described in paragraph numbers [0014] and [0015] above.

At least one advantage of this circuit is that Tl 514 (shown in FIG. 5A) in terms of the percentage of T (time of duty cycle) is controlled with very high accuracy by using the current ratio of Iup and Idown 524 (both shown in FIG. 5B). With 5% current mismatch Tl/T is only off by 0.5% duty cycle.

It will be understood, therefore, that the foregoing is only illustrative of the principles of the invention, and that various modifications can be made by those skilled in the art without departing from the scope and spirit of the invention, and the present invention is limited only by the claims that follow.

What is claimed is:

1. A slope compensation circuit that provides slope compensation in a switching regulator, the slope compensation circuit comprising:
   a pulse width modulator oscillator that generates an oscillator pulse train; a pulse width modulator that generates a modulator pulse train;
   a feedback loop that is responsive to the oscillator pulse train;
   a slope compensation pulse train of ON and OFF states that is responsive in part to the feedback loop and in part to the pulse width modulator switch pulse train;
   a switch that turns ON when the slope compensation pulse train is ON;
   a current source that supplies current though the switch when the switch is ON; and
   a slope compensation current source that generates slope compensation current when the switch is ON.

2. The slope compensation circuit of claim 1 further comprising a current mirror that mirrors a current responsive to the current though the switch in order to control the magnitude of the slope compensation current.

3. The slope compensation circuit of claim 1 wherein the slope compensation pulse train turns ON approximately twenty percent or less of the time associated with the pulse-width modulator duty cycle before the instant of the pulse width modulator switch OFF instant.

4. The slope compensation circuit of claim 1 wherein the duty cycle of the pulse width modulator switch pulse train is approximately fifty percent or greater.

5. The slope compensation circuit of claim 1 further comprising a current mirror that mirrors the current through the switch.

6. The slope compensation circuit of claim 1 wherein the slope compensation pulse train turns OFF substantially simultaneously to the instant the pulse width modulator switch pulse train turns OFF.

7. The slope compensation circuit of claim 1 wherein the feedback loop is configured to turn ON the slope compensation pulse train before the pulse width modulator switch pulse train shuts OFF.

8. A method of providing slope compensation in a switching regulator comprising:
   using a pulse width modulator oscillator to generate an oscillator pulse train;
   using a pulse width modulator to generate a modulator pulse train;
   providing a feedback loop that is responsive to the oscillator pulse train; and
   providing a slope compensation pulse train of ON and OFF states that is responsive in part to the feedback loop and in part to the pulse width modulator switch pulse train.

9. The method of claim 8 further comprising:
   turning ON a switch when the slope compensation pulse train is ON;
   supplying a current through the switch when the switch is ON; and
   generating slope compensation current when the switch is ON.

10. The method of claim 9 further comprising mirroring the current through the switch in order to control the magnitude of the slope compensation current.

11. The method of claim 9 further comprising turning ON the slope compensation approximately twenty percent or less of the time associated with the duty cycle of the pulse width modulator switch pulse train before the switch-OFF instant of the pulse width modulator switch pulse.

12. The method of claim 9 further comprising providing the slope compensation current only when the duty cycle of the pulse width modulator switch pulse train is approximately fifty percent or greater.

13. The method of claim 9 further comprising mirroring the current through the switch in order to generate the slope compensation current.

14. The method of claim 8 wherein the turning OFF the slope compensation pulse train occurs immediately following a turning-OFF of the pulse width modulator switch pulse train.

15. The method of claim 8 wherein the turning ON the slope compensation pulse train occurs less than twenty percent of the duty cycle of the pulse width modulator switch pulse train before the switch OFF instant of the pulse width modulator switch train.

16. A slope compensation circuit that provides slope compensation in a switching regulator, the slope compensation circuit comprising:
   a pulse width modulator oscillator that generates an oscillator pulse train;
   a pulse width modulator that generates a modulator pulse train;
   a feedback loop that is responsive to the oscillator pulse train;
   a slope compensation pulse train of ON and OFF states that is responsive to the feedback loop and is responsive to the pulse width modulator switch pulse train;
   a switch that turns ON when the slope compensation pulse train is ON;
   a current source that supplies current through the switch when the switch is ON; and
   a slope compensation current source that generates slope compensation current when the switch is ON.

* * * * *